United States Patent Office 2,719,097

Patented Sept. 27, 1955

2,719,097

METHOD FOR THE PRODUCTION OF THIN CONTINUOUS SURFACE LAYERS OF PRECIOUS METALS

Max Auwärter, Balzers, Liechtenstein, assignor to Alois Vogt, Vaduz, Liechtenstein No Drawing. Application May 6, 1950, Serial No. 160,586

Claims priority, application Switzerland May 7, 1949

1 Claim. (Cl. 117—107)

This invention relates to the production of electrical capacitors having electrically conductive means or layer formation on a dielectric base.

For the production of capacitors silver and gold are preferably used in the form of a thin metallic layer because of the high capacity of electric conductivity and of the high capacity of reflection, respectively, of said metals. The production of such layers by way of example for low loss capacitors at present takes place in such a manner that colloidally dispersed silver is applied to a mica base and is thereafter baked in at temperatures above 300° C. (572° F.). Such layers consist of discrete silver grains which due to the high mobility of the silver atoms at higher temperatures are formed by collective condensation. To obtain a perfect homogeneous silver layer it therefore is necessary to make such layers relatively thick. If the current-voltage-diagram of such a layer is plotted, then an irregularity becomes apparent in such a manner that with increasing voltage the current shows an unsteady increase. This phenomenon is connected with the coherer-effect appearing between the silver particles loosely compacted against each other. Between these discrete silver particles the passage of the electrons is discontinuous to such a degree that an increased random noise is thereby conditioned.

The experiment has been made to eliminate these disadvantages by creating thin rhodium layers by an evaporation in high vacuum instead of spraying on a layer of silver. Rhodium itself is, however, a metal having an electric conductivity considerably below that of silver, and in addition it is exceptionally expensive so that its use in engineering meets with economic difficulties.

The endeavor to evaporate silver onto a mica base encounters great difficulties for two reasons. Silver is a very soft metal and adheres only inadequately to the base. Silver also shows on evaporation at low temperatures the phenomenon of collective crystallization so that for this reason no continuous layers can be created. Thus, by way of example, thin silver layers evaporated onto mica initially show no electric conductivity whatsoever, because these evaporated silver atoms in a similar manner to the condensation of water on unclean surfaces form small drops between which no conductive connection exists. Only with relatively thick layers of silver this formation of droplets can be eliminated to such an extent that the electric conductivity is present over the whole surface.

The present invention relates to a method for the production of thin, continuous surface layers of precious metal, in particular of silver and gold, which eliminates the aforesaid and other disadvantages. The method according to the invention consists in that in a single operation a thin layer of copper is first of all evaporated onto the base, and immediately following this a layer of precious metal is evaporated thereon in a high vacuum.

Tests have shown, that even exceedingly thin layers of copper on glass as well as on mica and other similar, nonmetallic or dielectric bases, in contrast to silver, wet same and adhere exceptionally well and in addition remain homogeneous. If, by way of example, a layer of silver is evaporated on such a thin layer of copper in a high vacuum in a single operation, i. e. without subjecting the surface to oxidation by an admittance of air, then this layer of silver too has a high mechanical adhesive strength on the layer of copper and thus on the base. It has been proved that the aforementioned formation of droplets by collective crystallization does not occur even with very thin layers, so that a layer of silver produced in such a manner does not exhibit the aforementioned coherer-effect and that therefore the random noise of the capacitors provided with such layers can be reduced to a minimum. The base of copper has at the same time the great advantage that its electric conductivity is practically identical with that of silver so that the conductivity of the whole layer is not detrimentally affected. Such capacitor electrodes therefore consist as regards their conductivity of the highest grade of materials.

The method according to the present invention is also very suitable for the production of capacitors, since the layers produced in such a manner are homogeneous and continuous.

The method described can also be used with advantage for the production of layers of gold, although the disadvantages mentioned at the beginning are less pronounced with gold. The layers of gold produced according to the present invention nevertheless show considerable improvements as against the thin layers evaporated onto a surface according to the methods used up to now, said improvements consisting mainly in the fineness of the layer.

The method described is not limited to the metals mentioned, i. e. gold and silver, but is also suitable for layers made of other precious metals.

It can thus be seen that there has been provided according to the invention a very efficient and economic process for producing capacitors, in which silver employed in very thin layer formation adheres to a continuous copper layer on a dielectric base, said copper layer acting as a wetting agent and brings about adherence of silver thereon, the steps of the process being carried out, in a single operation, by vaporizing copper under high vacuum then condensing the resultant copper vapors onto said base to wet the latter and to adhere to said base as a thin, continuous copper layer, thereafter vaporizing silver, condensing resultant silver vapors onto said copper layer without causing collective crystallization of silver into droplets, and forming a thin, continuous surface layer of silver free from coherer effect on said continuous copper layer, said steps being conducted while said dielectric base is maintained continuously under high vacuum.

Having thus described the invention what is claimed as new and desired to be protected by U. S. Letters Patent is:

The process of forming electrically conductive means on a base of dielectric material in the production of electrical capacitors; comprising the steps, in a single operation, of vaporizing copper under high vacuum, then condensing the resultant copper vapors onto said base to wet the latter and to adhere to said base as a thin, continuous copper layer, thereafter vaporizing silver, condensing resultant silver vapors onto said copper layer said steps being conducted while said dielectric base is maintained continuously under high vacuum, thereby forming a thin, continuous surface layer of silver free from coherer effect on said continuous copper layer.

References Cited in the file of this patent

UNITED STATES PATENTS

| | | |
|---|---|---|
| 1,935,520 | Peacock | Nov. 14, 1933 |
| 2,079,784 | Williams | May 11, 1937 |
| 2,103,538 | Kolb | Dec. 28, 1937 |
| 2,239,770 | Becker et al. | Apr. 29, 1941 |
| 2,295,759 | Scheer | Sept. 15, 1942 |
| 2,382,432 | McManus et al. | Aug. 14, 1945 |
| 2,432,657 | Colbert et al. | Dec. 16, 1947 |